(12) United States Patent
Mizuno (10) Patent No.: US 9,115,786 B2
(45) Date of Patent: Aug. 25, 2015

(54) DRIVING FORCE TRANSMITTING DEVICE WHICH DISPOSES GEARS IN A SMALL SPACE AND OPTICAL UNIT

(71) Applicant: KYOCERA DOCUMENT SOLUTIONS INC., Osaka-shi (JP)

(72) Inventor: Masahiko Mizuno, Osaka (JP)

(73) Assignee: KYOCERA DOCUMENT SOLUTIONS INC., Osaka-Shi (JP)

( * ) Notice: Subject to any disclaimer, the term of this patent is extended or adjusted under 35 U.S.C. 154(b) by 0 days.

(21) Appl. No.: 14/355,825

(22) PCT Filed: Jan. 30, 2013

(86) PCT No.: PCT/JP2013/052090
§ 371 (c)(1),
(2) Date: May 1, 2014

(87) PCT Pub. No.: WO2013/115271
PCT Pub. Date: Aug. 8, 2013

(65) Prior Publication Data
US 2014/0334840 A1   Nov. 13, 2014

(30) Foreign Application Priority Data

Jan. 30, 2012   (JP) ................................. 2012-017319

(51) Int. Cl.
*G03G 21/00* (2006.01)
*F16H 1/04* (2006.01)
*F16H 55/17* (2006.01)
*F16H 57/021* (2012.01)
*G03G 15/04* (2006.01)
*G03G 21/16* (2006.01)
*F16H 57/02* (2012.01)
*F16H 1/20* (2006.01)

(52) U.S. Cl.
CPC .................. *F16H 1/04* (2013.01); *F16H 55/17* (2013.01); *F16H 57/021* (2013.01); *F16H 57/02004* (2013.01); *G03G 15/04* (2013.01); *G03G 15/04036* (2013.01); *G03G 21/1647* (2013.01); *G03G 21/1666* (2013.01); *F16H 1/20* (2013.01); *F16H 1/206* (2013.01); *G03G 2221/1684* (2013.01); *Y10T 74/19647* (2015.01)

(58) Field of Classification Search
CPC ... F16H 1/04; F16H 57/021; G03G 15/04036; G03G 21/00
USPC ................................................. 399/98; 74/413
See application file for complete search history.

(56) References Cited

U.S. PATENT DOCUMENTS

| 4,501,165 A | 2/1985 | Chaki |
| 5,202,597 A | 4/1993 | Ishida et al. |
| 8,831,468 B2 * | 9/2014 | Yuki ............................... 399/98 |
| 8,879,930 B2 * | 11/2014 | Mori ............................... 399/34 |

FOREIGN PATENT DOCUMENTS

| JP | S57-191130 U | 12/1982 |
| JP | S63-001953 U | 1/1988 |
| JP | S63-045452 U | 3/1988 |
| JP | H04-056938 U | 5/1992 |
| JP | 04-185942 A | 7/1992 |
| JP | H06-037785 U | 5/1994 |
| JP | H06-056544 U | 8/1994 |
| JP | 2006-046467 A | 2/2006 |
| JP | 2008-75872 A | 4/2008 |

* cited by examiner

*Primary Examiner* — William J Royer
(74) *Attorney, Agent, or Firm* — Knobbe Martens Olson & Bear LLP (57) ABSTRACT

A driving force transmitting device includes a first gear that rotates about the same rotational shaft as that of a small wheel portion and a second gear that engages with the small wheel portion and to which a rotational driving force is transmitted from the first gear. A rib member that rotatably supports the second gear is provided at a rotational center of the second gear. A first end portion of a rotational shaft is pivotally supported by an attachment plate within a root circle of the first gear. The annular rib member is provided on a web face of the first gear. The rib member has the same rotational shaft as the first gear and co-rotates with the first gear while supporting a second end portion of the rotational shaft.

7 Claims, 10 Drawing Sheets

PRIOR ART

DRIVING FORCE TRANSMITTING DEVICE WHICH DISPOSES GEARS IN A SMALL SPACE AND OPTICAL UNIT

CROSS-REFERENCE TO RELATED APPLICATIONS

This application is the U.S. National Phase under 35. U.S.C. §371 of International Application PCT/JP2013/052090, filed Jan. 30, 2013, which claims priority to Japanese Patent Application No. 2012-017319, filed Jan. 30, 2012. The disclosures of the above-described applications are hereby incorporated by reference in their entirety. The International Application was published under PCT Article 21(2) in a language other than English.

TECHNICAL FIELD

The present invention relates to a driving force transmitting device and an optical unit, more specifically to arrangement of gears provided in a state of being engaged with each other in order to transmit a rotational driving force from a driving force generating device.

BACKGROUND ART

A driving force transmitting device, that transmits a rotational driving force from a driving force generating device by means of engagement of a plurality of gears, has been conventionally known. In such a driving force transmitting device, a reducing gear such as a two stage gear is used in order to amplify a driving force from a driving force generating device. In such a driving force transmitting device, generally: (1) as shown in Patent Document 1 below, a second gear that receives a rotational driving force transmitted from a first gear on a downstream side of the first gear (two stage gear) is in a state of being engaged with a small wheel that rotates concentrically with a rotational shaft within a root circle of the first gear. A position where a rotational shaft of the second gear is disposed is configured to be outside of a large wheel of the first gear, in order that the second gear is pivotally supported by a device main body of the driving force transmitting device. (2) Alternatively, in a case in which the rotational shaft of the second gear is disposed at a position within the root circle of the first gear, the pivotal support of the second gear in the driving force transmitting device is realized by providing a separate bearing member for pivotally supporting the rotational shaft of the second gear at the position where the rotational shaft of the second gear is disposed.

Patent Document 1: Japanese Unexamined Patent Application Publication No. 2008-75872

DISCLOSURE OF THE INVENTION

Problems to be Solved by the Invention

However, in a case of disposing the rotational shaft of the second gear at a position outside of the large wheel of the first gear, as in the above described (1), the first gear and the second gear require a larger arrangement space. In addition, in a case of disposing a separate bearing member for pivotally supporting the rotational shaft of the second gear, as in the above described (2), an additional step for placing the bearing member is required. The requirement for the larger space and the additional step for an additional member lead to increased cost.

The present invention is aimed at allowing gears that transmit the rotational driving force from a driving force generating device to be disposed in a small space without an additional step, while reducing cost.

Means for Solving the Problems

The present invention is a driving force transmitting device provided with: a first gear that is rotated by a rotational driving force transmitted from a driving force generating device; and a second gear. The first gear has a small wheel portion provided integrally in a root circle and rotates about the same rotational shaft as that of the small wheel portion. The second gear engages with the small wheel portion of the first gear and to which a rotational driving force is transmitted from the first gear. A rotation support member that rotatably supports the second gear is provided at a rotational center of the second gear. A first end portion of the rotation support member is disposed in a device main body of the driving force transmitting device, in the root circle of the first gear. An annular rib member is provided on a web face of the first gear. The rib member has the same rotational shaft as the first gear and corotates with the first gear while supporting a second end portion side of the rotation support member disposed in the device main body.

EXPLANATION OF REFERENCE NUMERALS

1 Driving force transmitting device
11 First gear
110 Large wheel portion
111 Rotational shaft
112 Small wheel portion
113 Rib member
1131 First rib
1132 Second rib
1133 Concave portion
1135 Notch portion
114 Web face
12, 12-2 Second gear
12a, 12a-2 First side face
12b, 12b-2 Second side face
121, Rotational shaft 125 Hole
20, 21 Attachment plate
201 Boss member
71 Third gear
710 Wheel portion
M Motor

PREFERRED MODE FOR CARRYING OUT THE INVENTION

Figure 1:
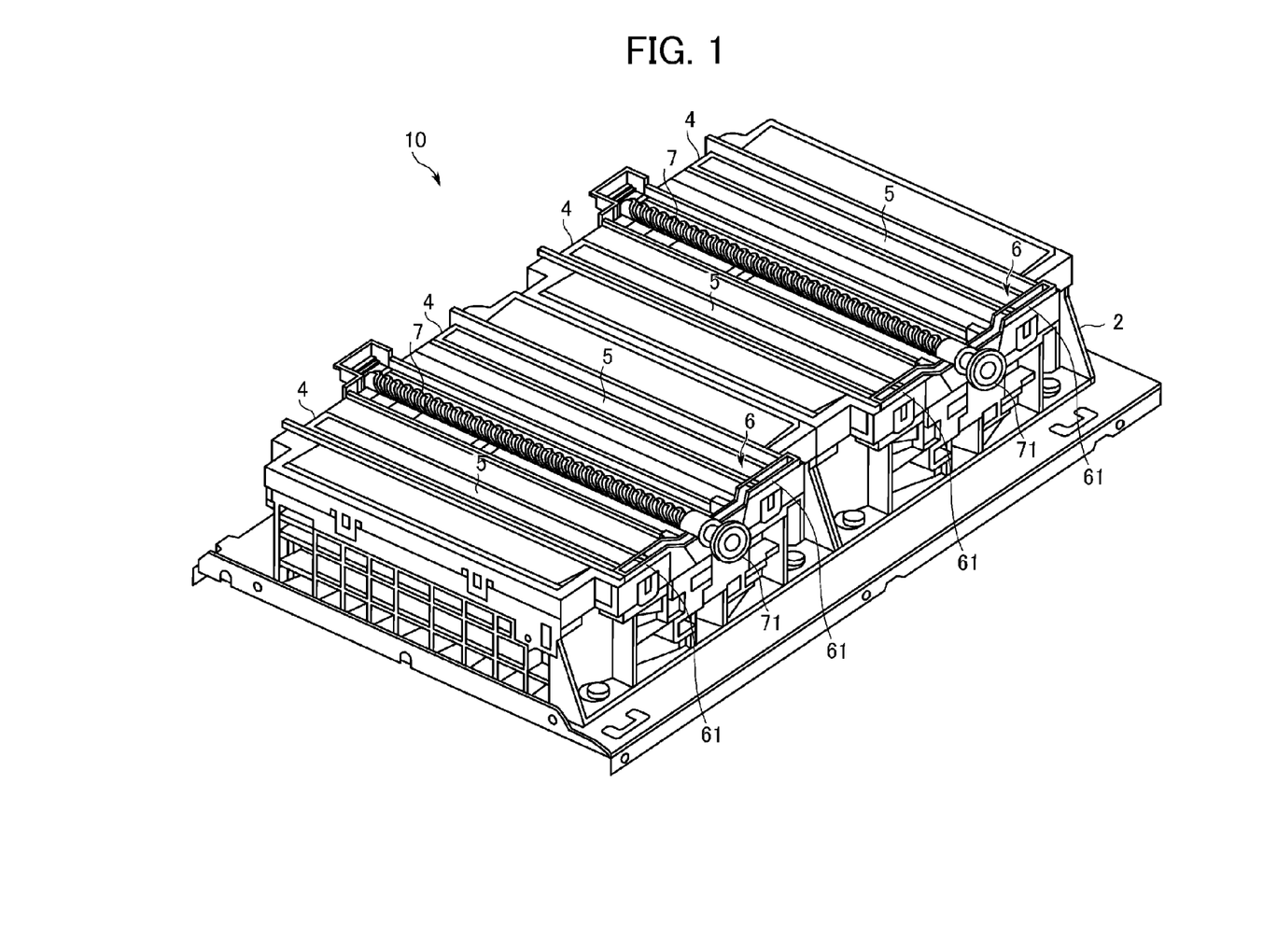
FIG. 1 is a plan view of an optical unit with a driving force transmitting device according to a first embodiment of the present invention being employed.

An image forming apparatus, which is an example of the driving force transmitting device according to a first embodiment of the present invention, is described hereinafter with reference to the drawings. FIG. 1 is a plan view of an optical unit with the driving force transmitting device according to the first embodiment of the present invention being employed.

An optical unit 10 is provided in an image forming apparatus that employs xerography such as a copy machine, printer, multifunction peripheral, and the like. In the first embodiment, the optical unit 10 is a laser scanner unit (LSU) that is provided in a color image forming apparatus having four photosensitive drums respectively for magenta, cyan, yellow, and black that are provided in parallel. In a housing 2 of the optical unit 10, four scanning optical systems are stored in parallel. The four scanning optical systems emit laser light for exposing a surface of the four photosensitive drums respectively.

On the housing 2, elongated rectangular four emission openings 4 are formed through which the laser light respectively emitted from the four scanning optical systems passes. Each of the emission openings 4 is covered by an elongated dustproof glass 5 that transmits light. Each of the emission openings 4 and the dustproof glass 5 have shapes extending in a horizontal scanning direction in which each of the photosensitive drums is irradiated with the laser light. A surface of the dustproof glass 5 is cleaned by a cleaning mechanism 6. The cleaning mechanism 6 is provided to be capable of cleaning two adjacent dustproof glasses 5.

In the housing 2, a screw shaft 7 that extends in the horizontal scanning direction is disposed. The screw shaft 7 is rotationally driven by a rotational driving force supplied by a driving force generating device (not illustrated) such as a motor. The rotational driving force from the driving force generating device is transmitted to the screw shaft 7 by the driving force transmitting device according to the first embodiment of the present invention (described later in detail). A rotational shaft of the screw shaft 7 is pivotally supported by a bearing 17 at a side end portion thereof on a side of connection with the driving force transmitting device.

Figure 2:
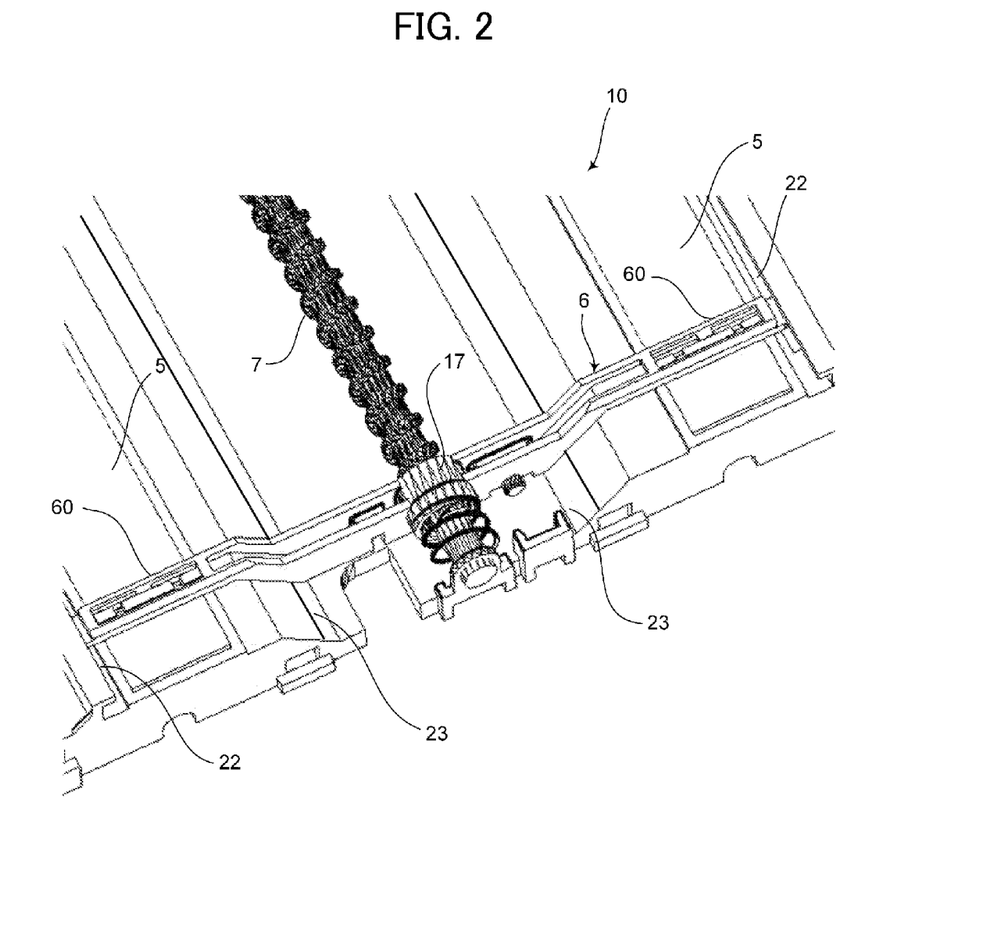
FIG. 2 is a perspective view illustrating a position where a cleaning mechanism is disposed in the optical unit.
Figure 3:
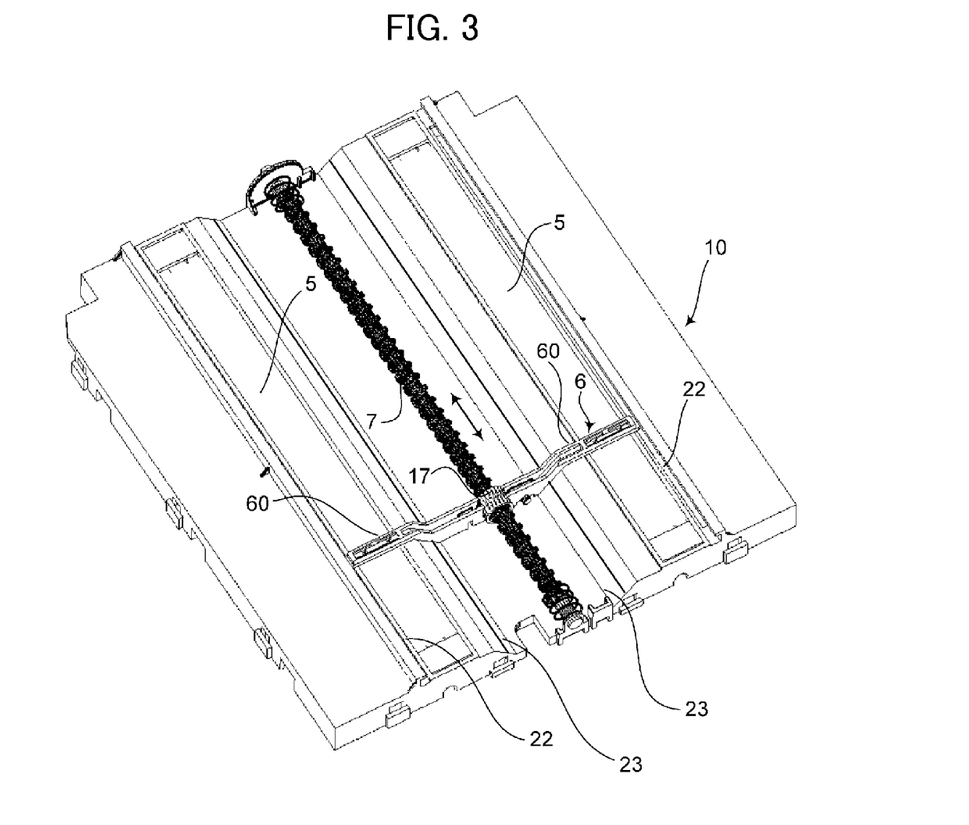
FIG. 3 is a perspective view illustrating a state in which the cleaning mechanism has been moved according to rotation of a screw shaft.
Figure 4:
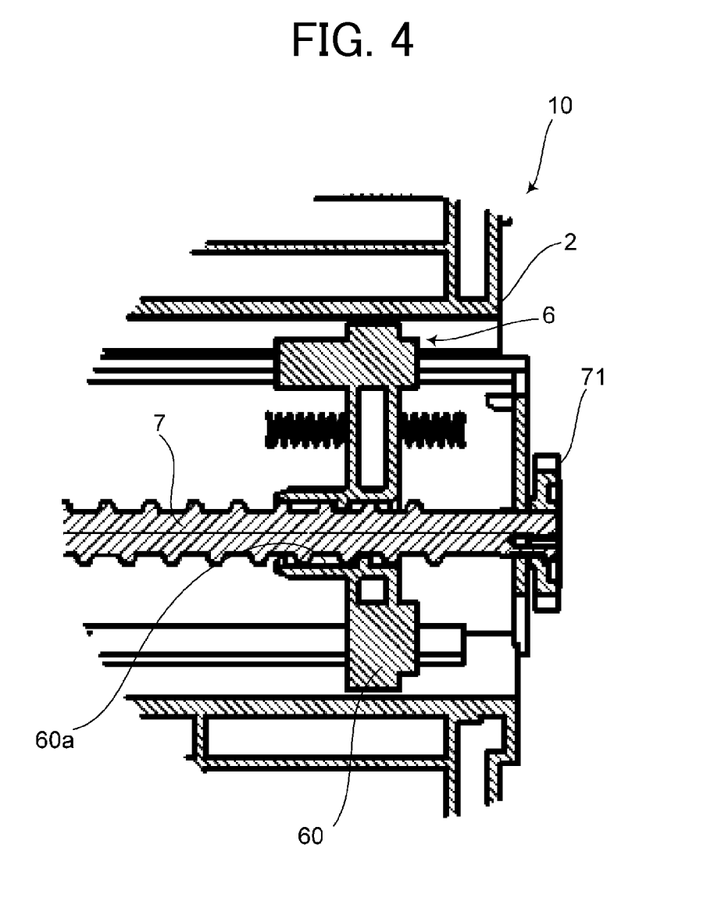
FIG. 4 is a cross-sectional view of a part of the cleaning mechanism screwed onto the screw shaft in a plan view.
Figure 5:
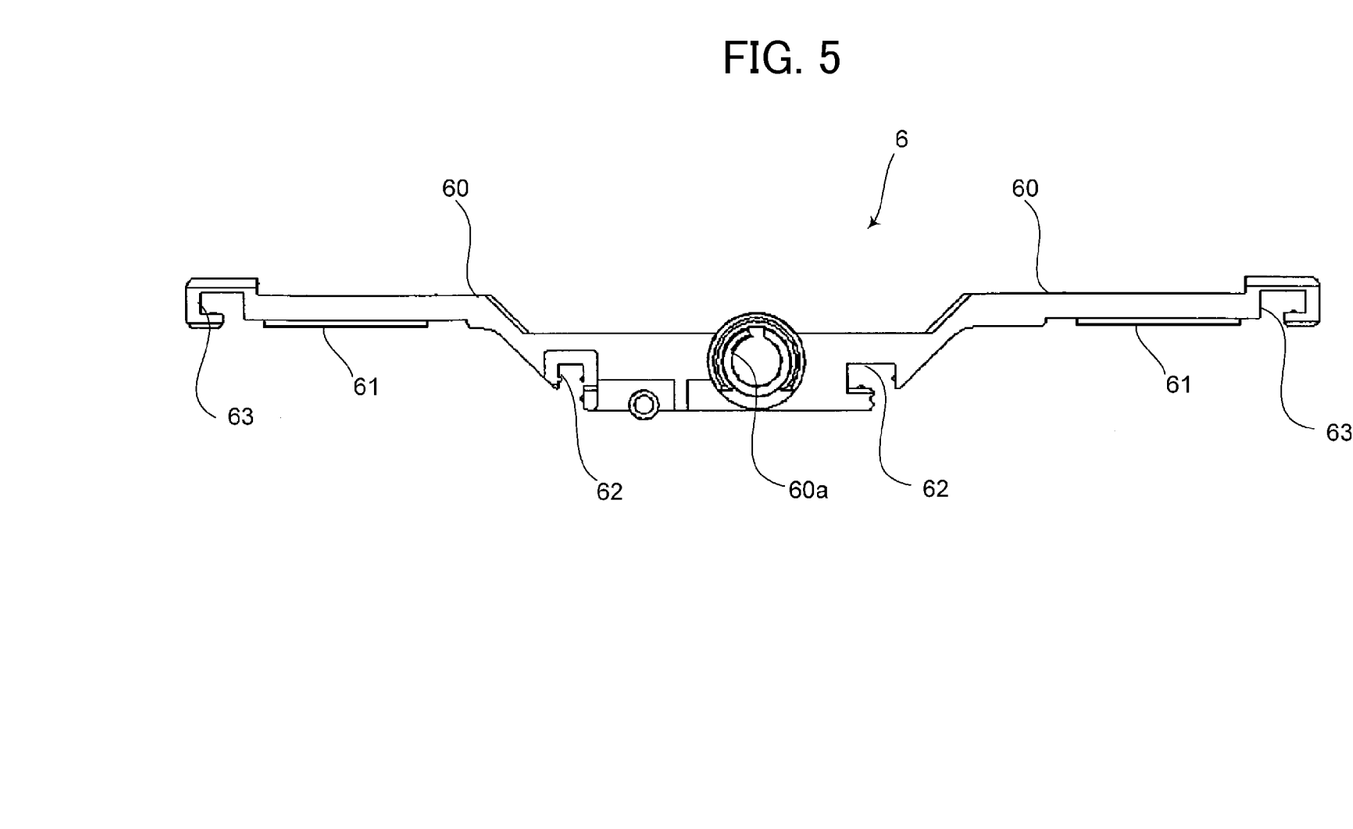
FIG. 5 is a side view of the cleaning mechanism.

FIG. 2 is a perspective view illustrating a position where the cleaning mechanism 6 is disposed in the optical unit 10. FIG. 3 is a perspective view illustrating a state in which the cleaning mechanism 6 has been moved according to rotation of the screw shaft 7. FIG. 4 is a cross-sectional view of a part of the cleaning mechanism 6 screwed onto the screw shaft 7 in a plan view. FIG. 5 is a side view of the cleaning mechanism 6. It should be noted that FIGS. 2 and 3 are drawings of a state in which a third gear 71 is not attached to the screw shaft 7.

The cleaning mechanism 6 is provided with a retaining member 60 that is attached to the screw shaft 7 and a cleaning member 61 that cleans the dustproof glass 5 in contact therewith. The cleaning member 61 is composed of an elastic blade member and the like, and is arranged on the dustproof glass 5.

In a central part of the retaining member 60, an engaging hole 60a that is screwed onto the screw shaft 7 is provided as shown in FIG. 4. The screw shaft 7 is attached to the engaging hole 60a in a state of being inserted and screwed thereinto. As a result, as the screw shaft 7 is rotated by the rotational driving force transmitted from the driving force transmitting device, the cleaning mechanism 6 moves along the screw shaft 7 in the horizontal scanning direction, as shown in FIG. 3. Here, the cleaning member 61 moves in contact with the dustproof glass 5, while frictioning the surface of the dustproof glass 5 to remove dust and the like on the surface of the dustproof glass 5.

As shown in FIG. 5, on the retaining member 60 of the cleaning mechanism 6, a guide groove 62 and a guide groove 63 are formed. On a top face of the housing 2 of the optical unit 10, guide rails 23, 22 that guide the movement of the cleaning mechanism 6 in the horizontal scanning direction are provided to correspond respectively to the guide groove 62 and the guide groove 63. In a state in which the guide rail 23 fits into the guide groove 62 and the guide rail 22 fits into the guide groove 63, the cleaning mechanism 6 is guided in the horizontal scanning direction to be slidably movable. In other words, as the rotational driving force from the driving force generating device is transmitted to the screw shaft 7 by the driving force transmitting device thereby rotating the screw shaft 7, the cleaning mechanism 6 moves in the horizontal scanning direction along the guide rails 23, 22.

Figure 6:
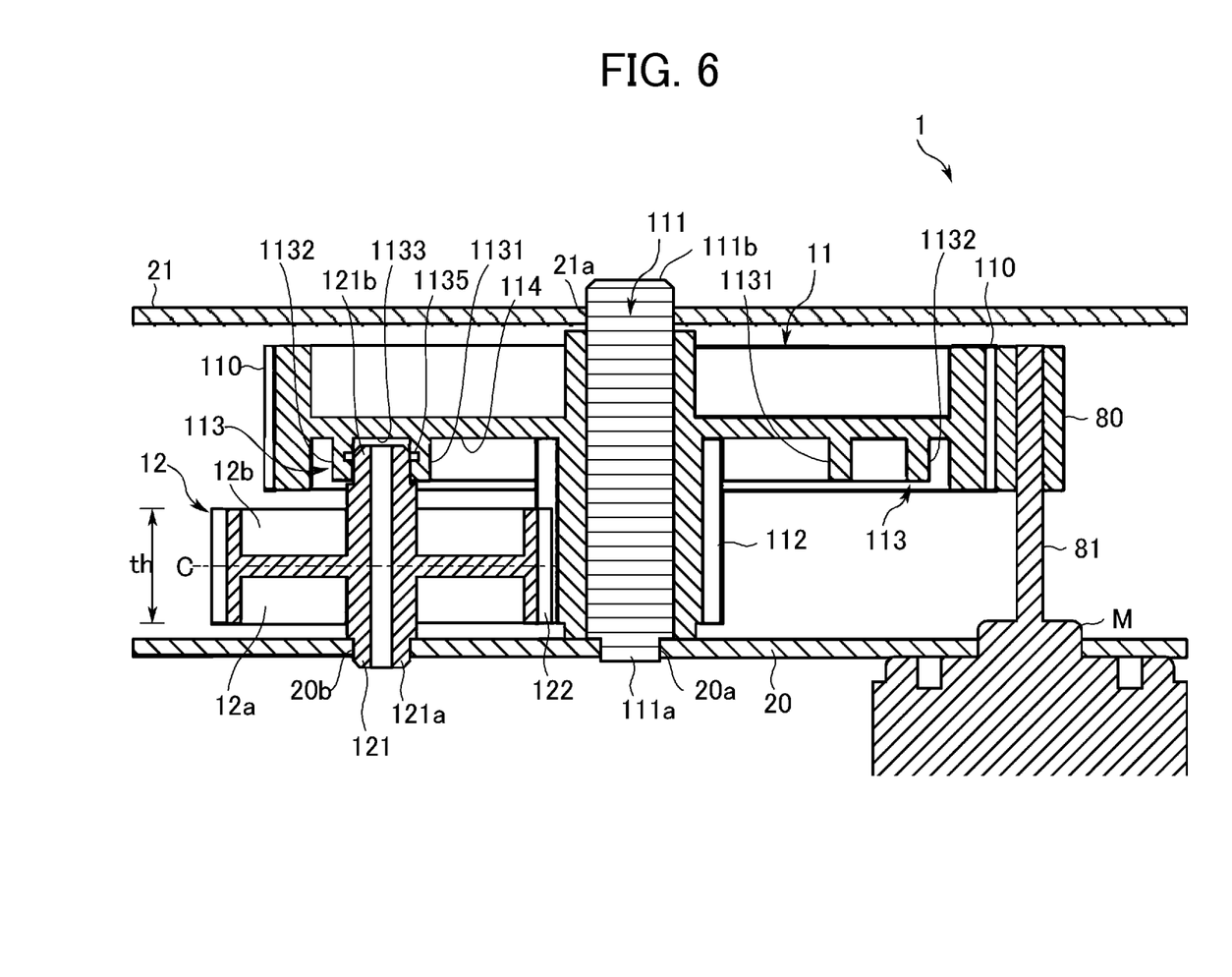
FIG. 6 is a cross-sectional view in a top view illustrating the first embodiment of the driving force transmitting device.
Figure 7:
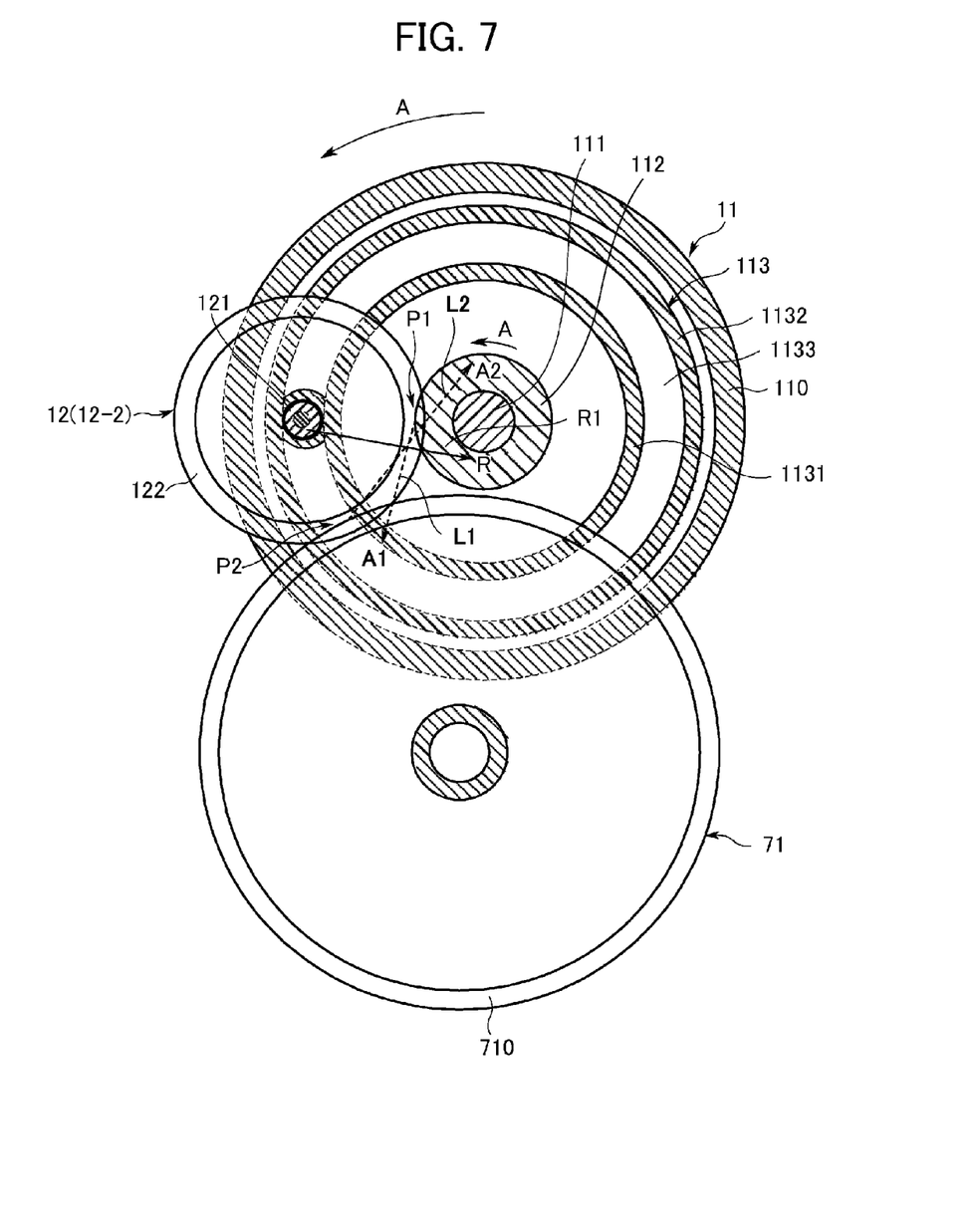
FIG. 7 is a side view illustrating gear portions composing the driving force transmitting device.

Next, the first embodiment of the driving force transmitting device is described. FIG. 6 is a cross-sectional view in a top view illustrating the first embodiment of the driving force transmitting device. FIG. 7 is a side view illustrating gear portions composing the driving force transmitting device.

A driving force transmitting device 1 is provided with a plurality of gears that transmits the rotational driving force generated by a motor M as the driving force generating device to a driven body. In the present embodiment, as described above, the driven body is the cleaning mechanism 6 provided in the optical unit 10. It should be noted that the driven body is not limited to the cleaning mechanism 6.

The driving force transmitting device 1 is provided with a first gear 11 and a second gear 12. The first gear 11 is a gear that is rotated by the rotational driving force transmitted directly or indirectly from the motor M. In the present embodiment, the first gear 11 engages with a motor gear 80 that is attached to a rotational shaft of the motor M and corotates, such that the rotational driving force from the motor M is directly transmitted to the first gear 11.

The first gear 11 is a two stage gear and includes a large wheel portion 110 provided in a peripheral part thereof and a small wheel portion 112. The small wheel portion 112 has a diameter smaller than that of the large wheel portion 110, and rotates about the same rotational shaft as the first gear 11. The small wheel portion 112 is provided in a root circle in the first gear 11 integrally with the first gear 11 (in other words, as a part of the first gear 11). A first end portion 111a of a rotational shaft 111 of the first gear 11 is pivotally supported in a state of being inserted into a hole 20a provided on an attachment plate 20. A second end portion 111b of the rotational shaft 111 is pivotally supported in a state of being inserted into a hole 21a provided on an attachment plate 21. The attachment plate 21 is, for example, a side face of the housing 2 of the above described optical unit 10. The attachment plates 20, 21 are plate-like members provided for pivotally support the gears. In the present embodiment, the attachment plates 20, 21 compose the device main body of the driving force transmitting device 1.

The second gear 12 is a gear that engages with the small wheel portion 112 of the first gear 11 and receives the rotational driving force from the first gear 11 by rotating with the first gear 11 due to the engagement. At a rotational center of the second gear 12, a rotational shaft 121 is provided. The rotational shaft 121 is integrally formed on a web face of the second gear 12.

The rotational shaft 121 of the second gear 12 is provided at a position within the root circle of the first gear 11. At this position, the second gear 12 is in a state of engaging with the small wheel portion 112 of the first gear 11. In other words, a part of the second gear 12 including the rotational shaft 121 is disposed at a position more on a side of the rotational shaft 111 of the first gear 11 than the large wheel portion 110 of the first gear 11 (that is, a position within the root circle of the first gear 11).

A first end portion of the rotational shaft 121 of the second gear 12 is pivotally supported at this position in a state of being inserted into a hole 20b provided on the attachment plate 20. In the present embodiment, the rotational shaft 121 is an example of the rotation support member that supports the second gear 12 in a rotatable state.

On a web face 114 in the root circle of the first gear 11, an annular rib member 113 that is formed around the rotational shaft 111 is provided. The rib member 113 is formed integrally with the web face 114 of the first gear 11. It should be noted that the rib member 113 can be fixed and bound to the web face 114 of the first gear 11.

The rib member 113 includes a first rib 1131 and a second rib 1132. The first rib 1131 is an annular member that has a diameter smaller than that of the second rib 1132 and is formed on a side to the rotational shaft 111. The second rib 1132 is provided on a side to the large wheel portion 110 with respect to the first rib 1131. In other words, the second rib 1132 has a diameter greater than that of the first rib 1131. A distance between the first rib 1131 and the second rib 1132 in the diametrical direction of the first gear 11 is the same as or slightly greater than the diameter of the rotational shaft 121 of the second gear 12.

The first rib 1131 and the second rib 1132 thus form a concave portion 1133 therebetween. The concave portion 1133 can accept the rotational shaft 121 of the second gear 12. In a state of being accepted, the rotational shaft 121 is rotatably inserted into the concave portion 1133. The first rib 1131 supports a first side portion of the rotational shaft 121 of the second gear 12 on a side to the rotational shaft 111 of the first gear 11. The second rib 1132 supports a second side portion of the rotational shaft 121 of the second gear 12 on an opposite side to a position where the first rib 1131 is disposed (in other words, a position on a side to the large wheel portion 110 of the first gear 11).

A first end portion 121a of the rotational shaft 121 of the second gear 12 is pivotally supported by the hole 20b on the attachment plate 20. A second end portion 121b of the rotational shaft 121 is inserted into the concave portion 1133 of the rib member 113. The concave portion 1133 is provided on the first gear 11 in a state in which the rotational shaft 111 is pivotally supported by the attachment plates 20, 21. The second gear 12 is thus rotatably supported by the concave portion 1133 and the hole 20b of the attachment plate 20 that function as bearings.

The concave portion 1133 is provided at a position on a trajectory of the second end portion 121b of the rotational shaft 121 of the second gear 12 when the first gear 11 rotates in a state of accepting the rotational shaft 121. As a result, the concave portion 1133 functions as a rail member that rotates in a state of accepting the rotational shaft 121 of the second gear 12 when the first gear 11 rotates.

A force of lowering under its own weight (in a depth direction in FIG. 6, a downward direction in FIG. 7) acts on the second end portion 121b of the rotational shaft 121 of the second gear 12 in a state of being rotatably inserted into the concave portion 1133. However, as described above, the first rib 1131 and the second rib 1132 have an annular shape thereby restricting downward movement of the second end portion 121b of the rotational shaft 121. As a result, the second end portion 121b in the concave portion 1133 is supported by the rib member 113 at a stable position in a vertical direction.

In a state in which the second end portion 121b of the rotational shaft 121 is rotatably inserted into the concave portion 1133, the first gear 11 rotates for example in a direction of an arrow A shown in FIG. 7, in response to the rotational driving force from the motor M. As a result, as described above, the rib member 113 rotates in a state in which the rotational shaft 121 is rotatably inserted into the concave portion 1133, while the rotational shaft 121 of the second gear 12 rotates in a state in which the second end portion 121b is supported by the rib member 113.

A third gear 71 is a gear that rotates in response to the rotational driving force transmitted from the second gear 12. The third gear 71 can also be a part of the driving force transmitting device 1. In the present embodiment, the third gear 71 is a driving gear that is provided on an end portion of the screw shaft 7 provided in the above described optical unit 10 so as to corotate with the screw shaft 7. In the screw shaft 7, the third gear 71 as the driving gear is provided on a side end portion thereof, which is a side connected to the driving force transmitting device 1.

A wheel portion 122 of the second gear 12 of the driving force transmitting device 1 engages with the third gear 71. With this engagement, the rotational driving force is transmitted from the second gear 12 to the third gear 71 as the second gear 12 rotates, to thereby rotate the third gear 71. In other words, by the transmission of the rotational driving force from the second gear 12 to the third gear 71, the rotational driving force from the motor M is transmitted to the screw shaft 7 of the cleaning mechanism 6 by the driving force transmitting device 1.

In a case in which the rotational driving force from the motor M is transmitted to the screw shaft 7 of the cleaning mechanism 6, each gear functions as indicated below.

When the motor M is driven and a rotational shaft 81 and a motor gear 80 of the motor M are rotationally driven, the large wheel portion 110 of the first gear 11 that engages with the motor gear 80 rotates about the rotational shaft 111 as a rotational center. The rotational driving force generated by the motor M is thus transmitted to the first gear 11. As the first gear 11 rotates, the small wheel portion 112 of the first gear 11 corotates with the first gear 11.

Since the wheel portion 122 of the second gear 12 engages with the small wheel portion 112 of the first gear 11, the second gear 12 rotates about the rotational shaft 121 pivotally supported by the attachment plate 20 and the rib member 113 of the first gear 11 as a rotational center.

It should be noted that, when the first gear 11 rotates, the concave portion 1133 of the rib member 113 of the first gear 11 is provided at a position on a trajectory of the second end portion 121b of the rotational shaft 121. As a result, the first gear 11 rotates without being interrupted by the rotational shaft 111 in a state of supporting the second end portion 121b of the rotational shaft 121. On the other hand, the second gear 12 is rotatably supported by the concave portion 1133 at the second end portion 121b of the rotational shaft 121. The second gear 12 can thus rotate without being influenced by the rotating first gear 11 and the rib member 113.

In such a case, rotation speed of the motor M is reduced by the driving force transmitting device 1 as indicated by the equation (A) below.

Rotation speed of the second gear 12 (rpm)=(Number of teeth of large wheel portion 110 of first gear 11 (Z2)/Number of teeth of motor gear 80 of motor M (Z1))*(Number of teeth of wheel portion 122 of second gear 12 (Z4)/Number of teeth of small wheel portion 112 of first gear 11 (Z3))   (A)

As the second gear 12 rotates and the rotational driving force of the motor M is transmitted to the second gear 12, the third gear 71 having the wheel portion 710 that engages with the wheel portion 122 of the second gear 12 rotates according to the rotation of the second gear 12. As a result, the rotational driving force is transmitted from the second gear 12 to the third gear 71. In other words, the rotational driving force of the motor M is transmitted to the screw shaft 7 via the third gear 71.

It should be noted that, the rotation speed of the third gear 71 (rpm)=number of teeth of wheel portion of the second gear 12 (Z4)/number of teeth of wheel portion of the third gear (Z5).

Figure 8:
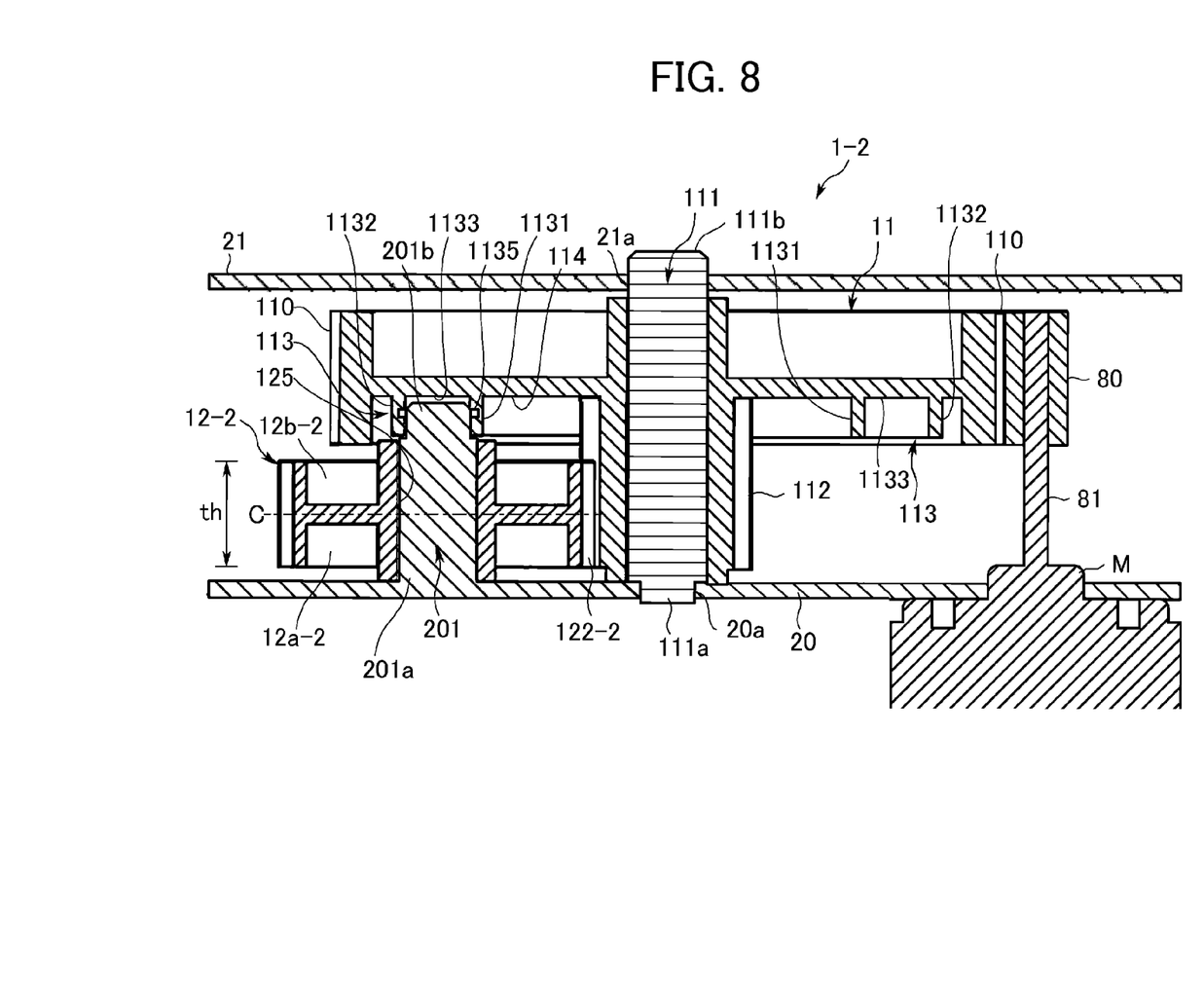
FIG. 8 is a cross-sectional view in a top view illustrating the second embodiment of the driving force transmitting device.

Next, a second embodiment of the driving force transmitting device according to the present invention is described. FIG. 8 is a cross-sectional view in a top view illustrating the second embodiment of the driving force transmitting device according to the present invention. For the same configuration as the first embodiment, description will be omitted.

In a driving force transmitting device 1-2 according to the second embodiment, the a second gear 12-2 engages with the small wheel portion 112 of the first gear 11 and is disposed within the root circle of the first gear 11, as in the driving force transmitting device 1 according to the first embodiment.

In the second embodiment, a boss member 201 is provided on the attachment plate 20. The boss member 201 is integrally formed with, or fixed to, the attachment plate 20. The boss member 201 has a cylindrical shape. A first end portion 201a of the boss member 201 is integrally formed with, or fixed to, the attachment plate 20 as described above. A second end portion 201b of the boss member 201 is rotatably inserted into the rib member 113 of the first gear 11. It should be noted that, for positioning of the first gear 11 with respect to the boss member 201, a diameter of a central part of the boss member 201 is set to be greater than a diameter of the second end portion 201b. The diameter of the second end portion 201b is set to be the same or slightly smaller than a width of the first rib 1131 and the second rib 1132 of the rib member 113 (in other words, a width of the concave portion 1133). In the present embodiment, the boss member 201 is an example of the rotation support member that rotatably supports the second gear 12-2.

The second gear 12-2 has, at a rotational center thereof, a hole 125 into which the boss member 201 is inserted. A diameter of the hole 125 is set to be the same or slightly greater than the diameter of the central part of the boss member 201. More specifically, the diameter of the hole 125 is in such a size that the boss member 201 is inserted into the hole 125 while allowing rotation, and the second gear 12-2 is rotatably supported by the boss member 201.

In other words, by fitting the hole 125 to the boss member 201, the second gear 12-2 is pivotally supported by the attachment plate 20 constituting the device main body. The position where the boss member 201 is disposed is the same as a position where the rotational shaft 121 of the second gear 12 according to the first embodiment is pivotally supported. In other words, the boss member 201 is disposed at a position where the small wheel portion 112 provided at a position within the root circle of the first gear 11, the small wheel portion 112 in a state in which the rotational shaft 111 is pivotally supported by the hole 20a of the attachment plate 20, engages with a wheel portion 122-2 of the second gear 12-2 in a state of being pivotally supported by the boss member 201. It should be noted that, as in the first embodiment, the first gear 11 is provided with the rib member 113 on the web face 114 at such a position that the end portion of the boss member 201 can be inserted thereinto while allowing rotation, within the root circle of the first gear 11.

As a result, as the first gear 11 is rotated by the rotational driving force transmitted from the motor gear 80 of the motor M as a result of drive of the motor M, the second gear 12-2, of which wheel portion 122-2 engages with the small wheel portion 112 of the first gear 11, rotates about the boss member 201 as the rotational center. And then, by the rotation of the second gear 12-2, the rotational driving force of the motor M is transmitted to the third gear 71 that engages and corotates with the second gear 12-2.

It should be noted that, in the above described embodiments, in the second gears 12, 12-2, first side faces 12a, 12a-2 are formed in the same shape as second side faces 12b, 12b-2 as shown in FIGS. 6 and 8. The second gear 12, 12-2 are formed such that shapes of both side portions thereof are symmetrical about a central portion C in a thickness direction th in which the rotational shafts 121, 121-2 extend. As a result, with regard to attachment of the second gear 12, 12-2 to the device main body, a restriction in attachment orientation of the second gear 12, 12-2 (discrimination between front and reverse sides of the second gear) is eliminated, thereby allowing improvement in efficiency of an attachment process. It should be noted that, the shape of the second gear 12, 12-2 is not limited to the present shape.

In addition, in the above described embodiments, in the first rib 1131 and the second rib 1132 of the rib member 113 of the first gear 11, a notch portion 1135 can be provided on a face opposite to the rotational shaft 121 of the second gear 12 or the boss member 201 (opposite face), as shown in FIGS. 6 and 8. The notch portion 1135 is formed by cutting out a part of the opposite face of at least any one of the first rib 1131 and the second rib 1132, and has a concave shape. It should be noted that, FIGS. 6 and 8 show an example in which the notch portion 1135 is formed on both of the first rib 1131 and the second rib 1132. The notch portion 1135 is formed in the whole or a part of circumference of the opposite face of the first rib 1131 extending in an annular shape in the web face 114 of the first gear 11, or of the opposite face of the second rib 1132.

As a result, grease that fills a gap between the rotational shaft 121 or the boss member 201 and the first rib 1131 and the second rib 1132 can be received by the notch portion 1135 before leaking from the concave portion 1133. It should be noted that the first rib 1131 and the second rib 1132 can be configured without providing the concave portion 1133.

Next, a position where the third gear 71 is disposed is described with reference to the abovementioned FIGS. 6 to 8.

Arrangement of the first gear 11 and the second gear 12, 12-2 is defined as described above. The third gear 71 is arranged at a position where a resultant force R of: an engaging load between the small wheel portion 112 provided in the first gear 11 and the second gear 12, 12-2; and an engaging load between the wheel portion 122 of the second gear 12, 12-2 and the third gear 71, is directed to the first rib 1131 of the rib member 113 provided on the first gear 11.

As shown in FIG. 7, the second gear 12, 12-2 is arranged within the root circle of the first gear 11 and the small wheel portion 112 of the first gear 11 is brought into engagement with the wheel portion 122 of the second gear 12, 12-2 or the wheel portion 122-2 of the second gear 12-2. As a result, at an engagement portion P1 therebetween, the wheel portion 122 or the wheel portion 122-2 of the second gear 12, 12-2 receives a pressing force in a direction of an arrow A1 due to the rotational driving force of the small wheel portion 112 of the first gear 11 rotating in a direction of an arrow A shown in FIG. 7. A load from the small wheel portion 112 of the first gear 11 is generated in the direction of the arrow A1. The load is shown by a dashed arrow L1.

Furthermore, with the rotational driving force obtained from the first gear 11, the second gear 12, 12-2 rotates the third gear 71 by applying the rotational driving force thereto. At an engagement portion P2 between the wheel portion 122, 122-2 of the second gear 12, 12-2 and the wheel portion 710 of the third gear 71, a force, by which the wheel portion 122 of the second gear 12 or the wheel portion 122-2 of the second gear 12-2 presses to rotate the wheel portion 710 of the third gear 71, acts. Here, as the second gear 12, 12-2 acts to rotate the third gear 71 in a stationary state, the second gear 12, 12-2 receives a reactive force from the third gear 71 at the engagement portion P2.

Here, in the driving force transmitting device 1, 1-2, the resultant force R of: the engaging load between the small wheel portion 112 provided in the first gear 11 and the second gear 12, 12-2; and the engaging load between the wheel portion 122, 122-2 of the second gear 12, 12-2 and the third gear 71, is directed to the first rib 1131 composing the rib member 113 provided on the first gear 11. Therefore, the third gear 71 is arranged at a position where the reactive force is directed from the engagement portion P2 in a direction of an arrow A2. The reactive force is indicated by a dashed arrow L2.

In other words, when the second gear 12, 12-2 receives the rotational driving force from the first gear 11 and transmits the rotational driving force to the third gear 71, the above described load L1 and the reactive force L2, as an additional load, are generated on the second gear 12, 12-2. As a result, the second gear 12, 12-2 is in a state of being pushed in a direction in which the resultant force R of the load L1 and the reactive force L2 is directed. In the driving force transmitting device 1, 1-2, the resultant force R is directed toward the first rib 1131 composing the rib member 113 of the first gear 11, as indicated by an arrow R1 in FIG. 7.

By the resultant force R, the second gear 12, 12-2 is pushed in the direction of the arrow R1. Since the second gear 12, 12-2 is supported by the attachment plate 20 and the rib member 113 of the first gear 11 by means of the rotational shaft 121 or the boss member 201, the rotational shaft 121 or the boss member 201 is pressed in the direction of the arrow R1. The rotational shaft 121 or the boss member 201 is thus pressed against the first rib 1131 of the rib member 113. As a result, such pressure increases a force that supports the rotational shaft 121 or the boss member 201 at the first rib 1131.

In a case of transmitting the rotational driving force of the motor M to the third gear 71 by the drive of the driving force transmitting device 1, 1-2, the rotational shaft 121 of the second gear 12 or the boss member 201 of the second gear 12-2 is pressed against the first rib 1131 of the rib member 113. This increases stability of support by the rib member 113.

In addition, a rotational direction of the rotational shaft 121, of the second gear 12, and a rotational direction of the first rib 1131 are such directions that peripheral faces thereof travel in the same direction. Furthermore, the rotational shaft 121 or the boss member 201 is pressed in a direction away from the second rib 1132. As a result, stability of support of the rotational shaft 121 or the boss member 201 by the rib member 113 can be increased without interfering rotation of the first gear 11 and the second gear 12, 12-2.

As described above, in the driving force transmitting device 1, 1-2, the rotational shaft 121 of the second gear 12 or the boss member 201 of the second gear 12-2 can be disposed at a position within the root circle of the first gear 11 by means of the rib member 113, which is a part of the first gear 11. As a result, for disposing the rotational shaft 121 of the second gear 12 or the boss member 201 of the second gear 12-2, no process for installing a separate additional member such as a bearing member is required. Therefore, the first gear 11 as well as the second gear 12, 12-2, that transmit the rotational driving force from the driving force generating device such as the motor M, can be disposed in a small space without an additional step, while reducing manufacturing cost.

Figure 9:
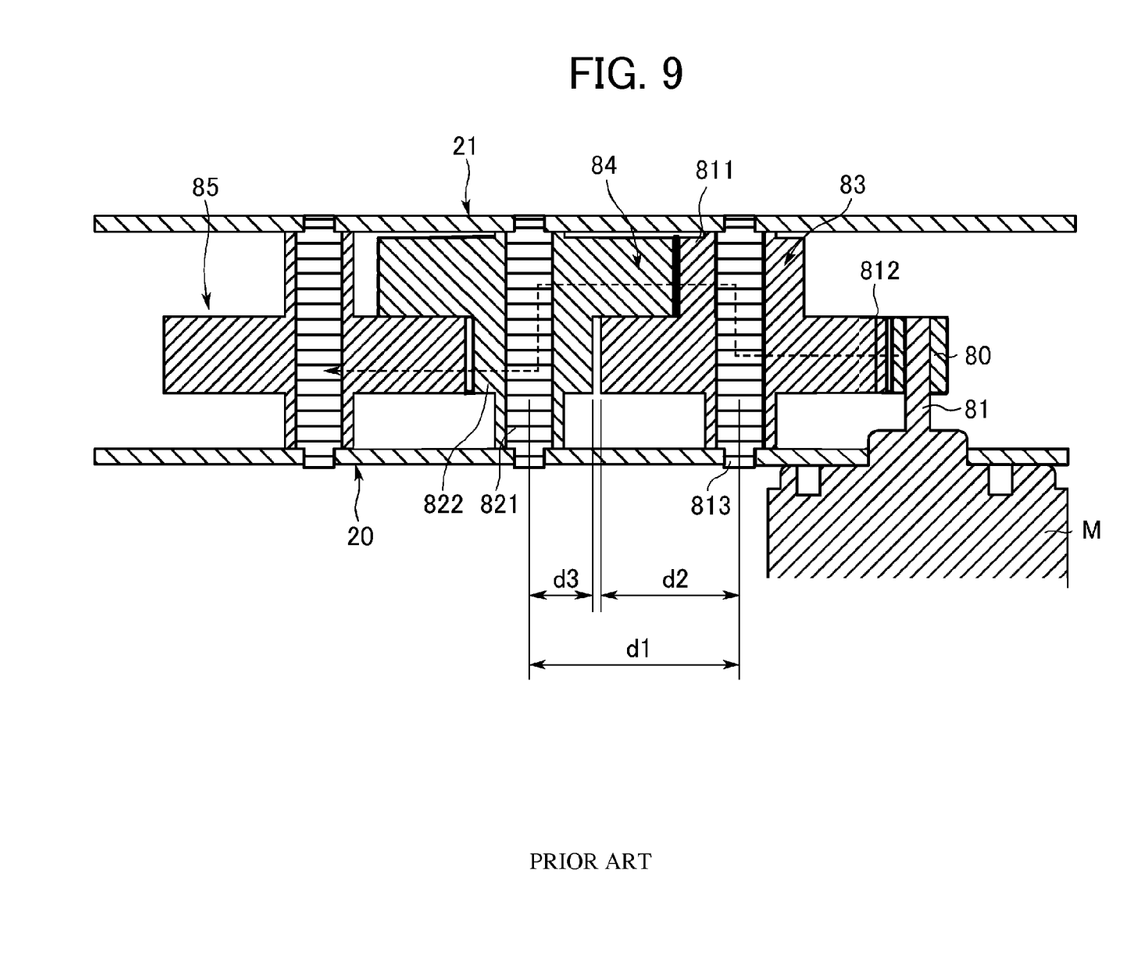
FIG. 9 is a cross-sectional view in a top view illustrating a conventional driving force transmitting device.

For example, in a conventional art as illustrated in FIG. 9 in which a rotational driving force is transmitted from a first gear 83 to a third gear 85 as indicated by a dashed line, a second gear 84, which receives the rotational driving force from the first gear 83, may be provided on a downstream side of the first gear 83, which is a two stage gear, in a state in which the second gear 84 engages with a small wheel 811. In this case, a rotational shaft 821 of the second gear 84 must be positioned outside of a large wheel portion 812 of the first gear 83. In other words, the arrangement of the gears must be in a relationship d2<d1−d3, wherein: d2 being a distance between the rotational shaft 813 of the first gear 83 to the large wheel portion 812; d1 being a distance between a rotational shaft 813 of the first gear 83 and the rotational shaft 821 of the second gear 84; and d3 being a distance between the rotational shaft 821 of the second gear 84 and a small wheel portion 822 of the second gear 84 (a radius of the small wheel portion 822). This requires a larger space for disposing the first gear 83 and the second gear 84.

On the contrary, the driving force transmitting device 1, 1-2 according to the embodiments of the present invention allows the second gear 12, 12-2 to be disposed at a position within the root circle of the first gear 11 by supporting the rotational shaft 121 of the second gear 12 or the boss member 201 of the second gear 12-2 by the first rib 1131 and the second rib 1132 of the rib member 113. This allows reduction of space required for disposing the first gear 11 and the second gear 12, 12-2.

Figure 10:
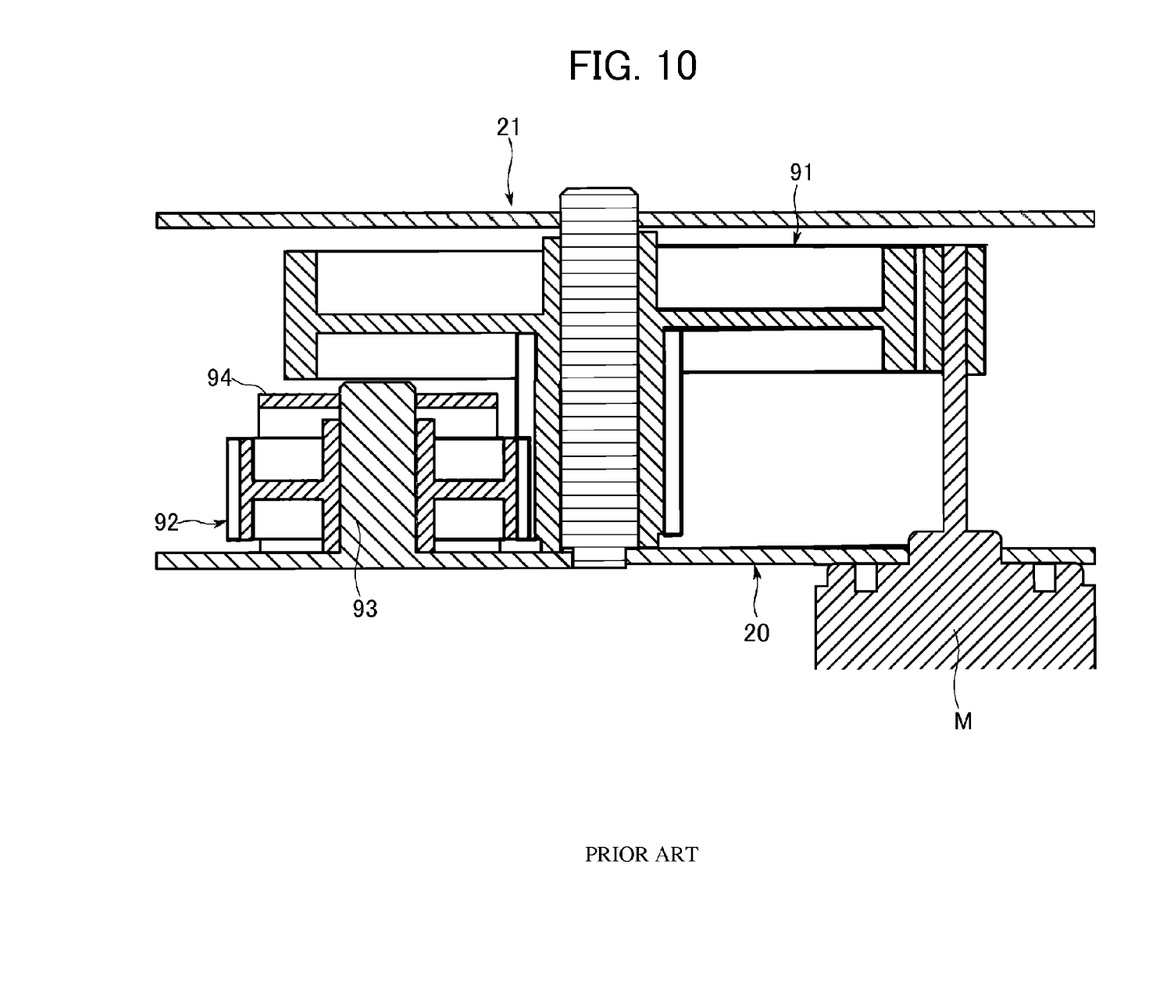
FIG. 10 is a cross-sectional view in a top view illustrating a conventional driving force transmitting device.

In addition, as shown in FIG. 10, by installing a separate bearing member 94 for pivotally supporting a boss member 93 of a second gear 92 within the root circle of a first gear 91, the second gear 92 can be disposed at a position within the root circle of the first gear 91. In this case, an additional step for separately disposing the bearing member 94 is required.

On the other hand, in the driving force transmitting device 1, 1-2 according to the embodiments of the present invention, the rib member 113 that supports the rotational shaft 121 of the second gear 12 or the boss member 201 of the second gear 12-2 is disposed only by attaching the first gear 11 to the attachment plates 20, 21 as the device main body. By inserting and attaching the rotational shaft 121 of the second gear 12 or the boss member 201 of the second gear 12-2 to the rib member 113, the second gear 12, 12-2 can be disposed. As a result, since no additional member is required for disposing the second gear 12, 12-2 at a position within the root circle of the first gear 11, the second gear 12, 12-2 can be disposed at a position within the root circle of the first gear 11 without an additional step for installing the additional member.

It should be noted that the present invention is not limited to the above described embodiments and can be carried out in various modes. The configuration and process described in the above described embodiments with reference to FIGS. 1 to 8 are merely embodiments of the present invention. The present invention is not limited to the configuration and process. Although the driving force transmitting device has been described as the image forming apparatus, which is an example thereof, the driving force transmitting device can be applied to any other electronic devices.

What is claimed is:

1. A driving force transmitting device comprising:
    a first gear that is rotated by a rotational driving force transmitted from a driving force generating device, the first gear having a small wheel portion provided integrally in a root circle and rotating about the same rotational shaft as that of the small wheel portion; and
    a second gear that engages with the small wheel portion of the first gear and to which a rotational driving force is transmitted from the first gear,
    wherein: a rotation support member that rotatably supports the second gear is provided at a rotational center of the second gear;
    a first end portion of the rotation support member is disposed in a device main body of the driving force transmitting device, in the root circle of the first gear; and
    an annular rib member is provided on a web face of the first gear, the rib member having the same rotational shaft as the first gear and corotating with the first gear while supporting a second end portion of the rotation support member disposed in the device main body.

2. The driving force transmitting device according to claim 1, wherein the rotation support member is a rotational shaft of the second gear that is integrally provided with the second gear.

3. The driving force transmitting device according to claim 1, wherein the rotation support member is a shaft portion that is fixed to the device main body, the shaft portion being inserted into a hole portion provided at the rotational center of the second gear to rotatably support the second gear.

4. The driving force transmitting device according to claim 1, further comprising a third gear that engages with the second gear and to which a rotational driving force is transmitted from the second gear, wherein
    the rib member provided on the first gear includes a first rib that supports the first end portion of the rotation support member of the second gear on a side of the rotational shaft of the first gear and a second rib that supports the second end portion of the rotation support member at a position on an opposite side to a position where the first rib is disposed; and
    the third gear is arranged at a position where a resultant force of an engaging load with the small wheel portion of the first gear generated at the second gear and an engaging load with the third gear generated at the second gear is directed to the first rib of the rib member provided on the first gear.

5. The driving force transmitting device according to claim 1, wherein the second gear is formed such that shapes of both end portions thereof are symmetrical about a central portion in a thickness direction in which a rotational shaft of the second gear extends.

6. The driving force transmitting device according to claim 1, wherein a notch portion is provided on the rib member provided on the first gear at a position opposite to the rotation support member, the notch portion being capable of storing grease that fills a gap between the rib member and the rotation support member.

7. An optical unit comprising:
    an emission opening that lets light through;
    a dustproof glass that covers the emission opening;
    a driving force generating device that generates a rotational driving force;
    a driving force transmitting device;
    a screw shaft that is rotated by the rotational driving force transmitted from the driving force transmitting device; and
    a cleaning member that cleans a surface of the dustproof glass while moving on the surface of the dustproof glass by rotation of the screw shaft,
    wherein: the driving force transmitting device is provided with
    a first gear that is rotated by the rotational driving force transmitted from the driving force generating device, the first gear having a small wheel portion provided integrally in a root circle and rotating about the same rotational shaft as that of the small wheel portion and
    a second gear that engages with the small wheel portion of the first gear and to which a rotational driving force is transmitted from the first gear;
    a rotation support member that rotatably supports the second gear is provided at a rotational center of the second gear;
    a first end portion of the rotation support member is disposed in a device main body of the driving force transmitting device, in the root circle of the first gear; and
    an annular rib member is provided on a web face of the first gear, the rib member having the same rotational shaft as the first gear and corotating with the first gear while supporting a second end portion of the rotation support member disposed in the device main body.

* * * * *